Oct. 3, 1939.    C. B. SPANGENBERG    2,174,910
AUTOMATIC RESET MECHANISM
Filed Nov. 23, 1936    2 Sheets-Sheet 1

Inventor
Charles B. Spangenberg
By George H. Fisher
Attorney

Charles B. Spangenberg
By George H Fisher
Attorney

Patented Oct. 3, 1939

2,174,910

UNITED STATES PATENT OFFICE 2,174,910

AUTOMATIC RESET MECHANISM

Charles B. Spangenberg, Minneapolis, Minn., assignor to Minneapolis-Honeywell Regulator Company, Minneapolis, Minn., a corporation of Delaware Application November 23, 1936, Serial No. 112,337

10 Claims. (Cl. 236—74)

This invention relates to automatic reset or load compensation mechanisms as applied to a follow-up control system.

It is an object of this invention to provide a follow-up control system for controlling the value of a condition along with a novel automatic reset or load compensation mechanism for maintaining the value of the condition to be controlled at the desired normal value regardless of changes in load.

It is another object of this invention to provide an automatic reset mechanism for a follow-up system with a means for adjusting the rate of reset.

The specific details of construction and the mode of operation of the control system of this invention also form objects.

Other objects and advantages will become apparent to those skilled in the art upon reference to the accompanying specification, claims and drawings.

Figures 1, 2:
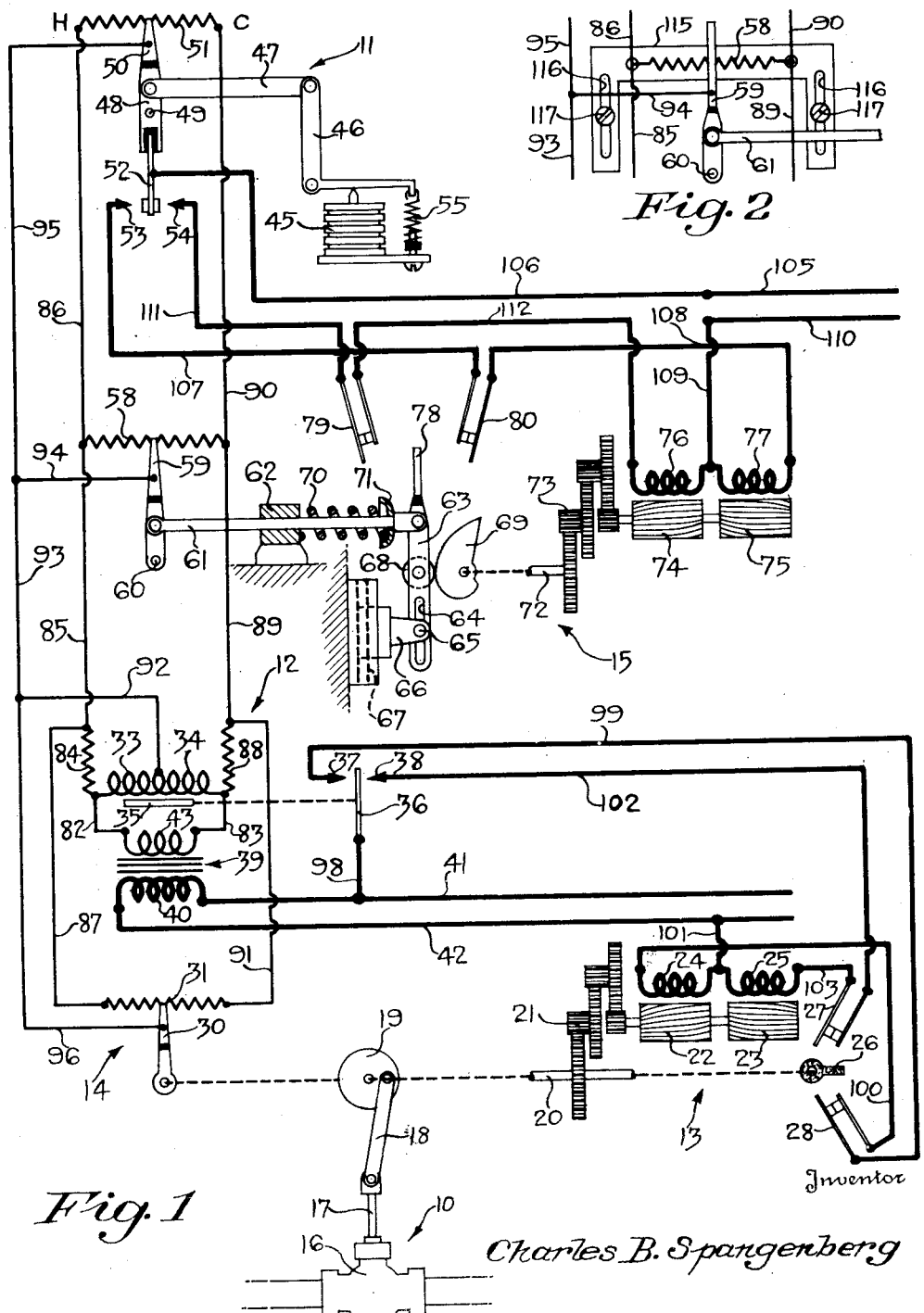
Figure 3:
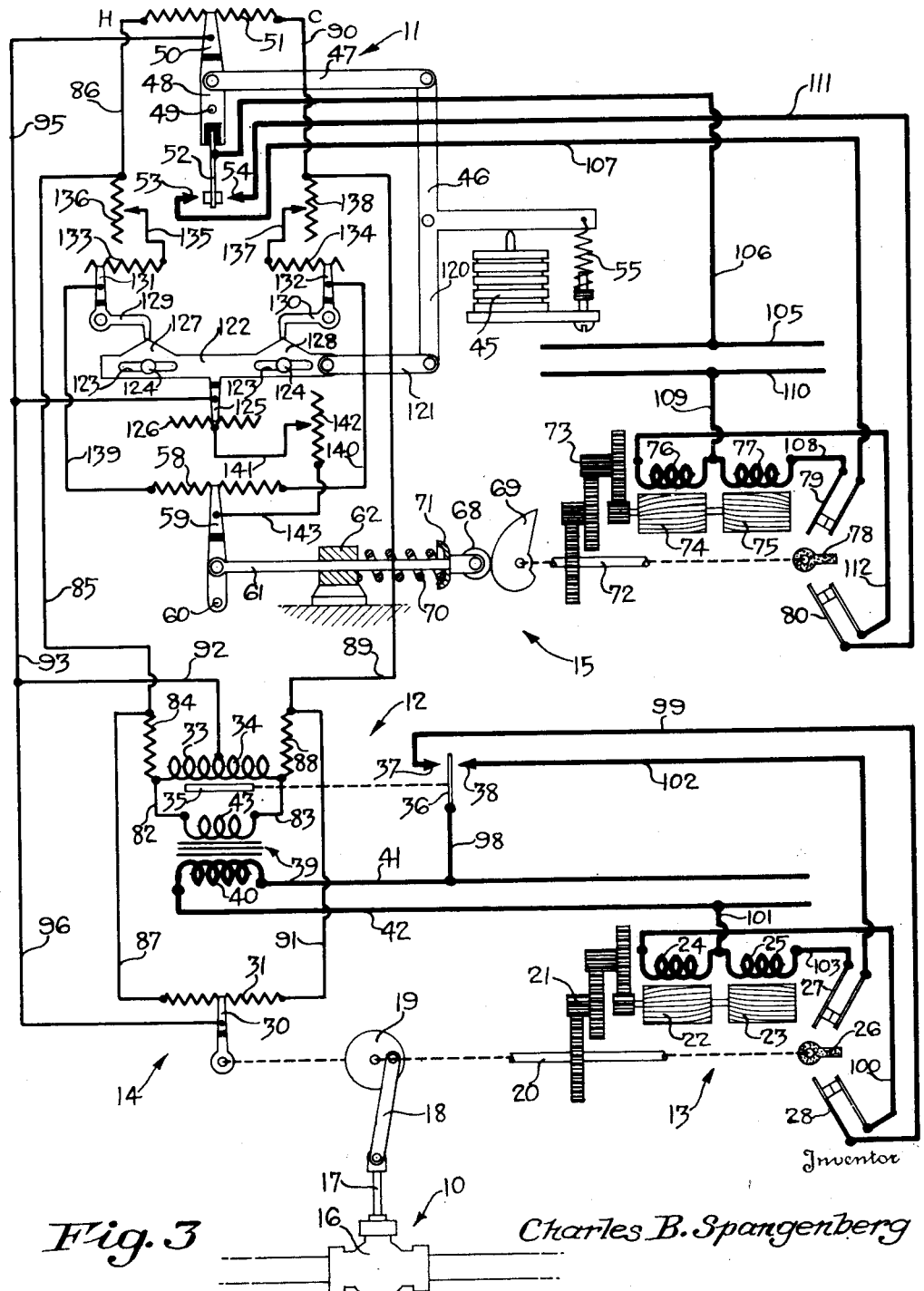

For a more thorough understanding of this invention, reference is made to the accompanying drawings in which:

Figure 1 diagrammatically discloses a follow-up control system along with an adjustable automatic reset mechanism for obtaining the desired results;

Figure 2 shows a modified adjustable reset mechanism which may be utilized in the follow-up control system of Figure 1; and Figure 3 shows a follow-up control system in combination with an adjustable automatic reset mechanism wherein the rate of reset varies in accordance with the amount of deviation of the condition to be controlled from the desired normal value.

Referring now to Figure 1, a device to be positioned in a plurality of positions for controlling the value of a condition is generally designated at 10. Control means the state of which is varied in accordance with changes in the value of the condition to be controlled is generally designated at 11. The control means 11 controls the operation of a relay generally designated at 12, which, in turn, controls the operation of a motor generally designated at 13. The motor 13 positions the device 10 and also operates a follow-up means generally designated at 14. The follow-up means 14, in turn, controls the operation of the relay 12 providing a true follow-up control system.

An automatic reset mechanism generally designated at 15 also controls the operation of the relay 12 to maintain the value of the condition to be controlled at the desired normal value regardless of changes in load.

Although the control system of this invention may be utilized for controlling the value of any condition, it is disclosed for purposes of illustration as controlling a temperature condition and more particularly the temperature of a space (not shown). Therefore, the device 10 which is positioned in a plurality of positions is shown to be a valve 16 for controlling the supply of heating fluid to the space. Valve 16 may be operated by a valve stem 17 which is connected by a pitman 18 to a crank disc 19 carried by a shaft 20 of the motor 13. The shaft 20 is operated through a reduction gear train 21 by motor rotors 22 and 23. The rotors 22 and 23 are controlled by field windings 24 and 25, the arrangement being such that when the field winding 24 is energized, valve 16 is moved toward an open position and when the field winding 25 is energized, the valve 16 is moved toward a closed position.

Shaft 20 also operates an abutment member 26 for opening limit switches 27 and 28 when the valve 16 is moved to an extreme closed position or an extreme open position, respectively. The shaft 20 also operates a slider 30 with respect to a potentiometer resistance element 31. The slider 30 and the potentiometer resistance element 31 form a balancing potentiometer, the operation of which will be pointed out more fully hereafter. When the valve 16 is moved toward an open position, the slider 30 is moved to the left and when the valve 16 is moved toward a closed position, the slider 30 is moved toward the right.

The relay generally designated at 12 may comprise relay coils 33 and 34 for influencing an armature 35. The armature 35 is suitably connected to a switch arm 36 which is adapted to engage spaced contacts 37 and 38. When the relay coil 33 is energized more than the relay coil 34, the switch arm 36 is moved into engagement with the contact 37 and when the relay coil 34 is energized more than the relay coil 33, the switch arm 36 is moved into engagement with the contact 38. When the relay coils 33 and 34 are equally energized, the switch arm 36 is maintained spaced midway between the contacts 37 and 38, as shown in Figure 1. Power is supplied to the relay 12 by means of a step-down transformer 39 having a primary 40 connected across line wires 41 and 42 and a secondary 43.

The control means generally designated at 11 is shown to be a thermostatic control means having a thermostatic device 45 responsive to variations in space temperature. The thermostatic device 45 may be of the usual type comprising a bellows containing a volatile fluid. The thermostatic device 45 operates a bell crank lever 46 which is connected by a link 47 to a lever 48 pivoted at 49. Lever 48 carries a slider 50 which is adapted to slide across a resistance element 51. The slider 50 and the resistance element 51 form a control potentiometer. The lever 48 also carries a resilient switch arm 52 which is adapted to engage spaced contacts 53 and 54. The thermostatic device 45, and consequently the setting of the control means 11, may be adjusted by suitably varying the tension in a tension spring 55 connected to the bell crank lever 46. Upon an increase in space temperature, the slider 50 is moved to the left in the direction indicated by the character H and the switch arm 52 moves into engagement with the contact 54. Upon a decrease in space temperature, the slider 50 moves to the right in the direction indicated by the character C and the switch arm 52 moves into engagement with the contact 53. When the space temperature is at the desired normal value, the slider 50 assumes a midposition and the switch arm 52 is maintained spaced midway between the contacts 53 and 54. This represents the normal state of the control means.

The reset mechanism generally designated at 15 may comprise a resistance element 58 and a slider 59 which is pivoted at 60. The resistance 58 and the slider 59 form a compensating potentiometer. The slider 59 is connected to a rod 61 which is guided in a suitable stationary guide 62. The rod 61 is secured to a lever 63 which is provided with an elongated slot 64. The slot 64 is engaged by a pin 65 carried by a bracket 66. The bracket 66 is adapted to be moved longitudinally in a guide 67. The lever 63 carries a cam follower 68 which is adapted to engage the surface of a cam 69. A spring 70 interposed between the guide 62 and a spring retainer cup 71 carried by the rod 61 maintains the cam follower 68 in engagement with the cam 69. The cam 69 is carried by a shaft 72 and is rotated through a reduction gear train 73 by motor rotors 74 and 75. The rotors 74 and 75 are operated by field windings 76 and 77. The arrangement is such that when the field winding 77 is energized, the cam 69 is rotated in a clockwise direction to move the slider 59 to the right. When the field winding 76 is energized, the cam 69 is rotated in a counter-clockwise direction to move the slider 59 to the left. The amount of movement imparted to the slider 59 for a given rotation of the cam 69 may be adjusted by sliding the bracket 66 and consequently the pivot 65 upwardly or downwardly with respect to the slot 64 formed in the lever 63. With the pivot 65 moved upwardly towards the cam follower 68, the amount of movement of the slider 59 for a given movement of the cam 69 will be great and with the pivot 65 moved downwardly from the cam follower 68, the amount of movement of the slider 59 for a given movement of the cam 69 will be relatively small. The lever 63 carries an abutment member 78 which is adapted to open limit switches 79 and 80 when the slider 59 is moved to either an extreme left-hand or an extreme right-hand position, respectively.

The ends of the secondary 43 are connected to the left end of the relay coil 33, and the right end of the relay coil 34 by wires 82 and 83, respectively. The left end of the relay coil 33 is connected by a protective resistance 84 and wires 85, 86 and 87 to the left ends of the control potentiometer resistance element 51, the compensating potentiometer resistance element 58 and the balancing potentiometer resistance element 31. In a like manner, the right end of the relay coil 34 is connected by a protective resistance 88 and wires 89, 90 and 91 to the right ends of the control potentiometer resistance element 61, the compensating potentiometer resistance element 58 and the balancing potentiometer resistance element 31. The relay coils 33 and 34 are connected together and the junction of these relay coils is connected by wires 92, 93, 94, 95 and 96 to the slider 50 of the control potentiometer, the slider 59 of the compensating potentiometer and the slider 30 of the balancing potentiometer. By reason of these connections, it is seen that the control potentiometer, the compensating potentiometer and the balancing potentiometer are all connected in parallel with each other and with the series connected relay coils 33 and 34 and that the various potentiometers and the series connected relay coils are connected across the secondary 43 of the step-down transformer 39.

Omitting for the time being the operation of the reset mechanism 15 including the compensating potentiometer, it is assumed that the parts are in the position shown in Figure 1, the space temperature is at the desired normal value and the valve 16 is in a midposition for supplying just the correct amount of heat to make up for the heat losses from the space. Upon a decrease in space temperature, slider 50 is moved to the right in the direction indicated by the character C and by reason of the parallel relationship pointed out above, the energization of the relay coil 34 is decreased and the energization of the relay coil 33 is increased. As a result of these unequal energizations of the relay coils 33 and 34, the switch arm 36 is moved into engagement with the contact 37 to complete a circuit from the line wire 41 through wire 98, switch arm 36, contact 37, wire 99, limit switch 28, wire 100, field winding 24, and wire 101 back to the other line wire 42. Completion of this circuit energizes the field winding 24 to move the valve 16 toward an open position to increase the supply of heat to the space. Operation of the motor 13 to move the valve 16 toward an open position causes left-hand movement of the slider 30 of the balancing potentiometer. This left-hand movement of the slider 30 decreases the energization of the relay coil 33 and increases the energization of the relay coil 34. When the slider 30 has moved sufficiently far to the left to rebalance the energizations of the relay coils 33 and 34, the switch arm 36 is moved out of engagement with the contact 37 to break the circuit through the field winding 24. In this manner, the valve 16 is modulated toward an open position in direct accordance with the amount of decrease in space temperature.

Upon an increase in space temperature, the slider 50 is moved to the left in the direction indicated by the character H and this left-hand movement of the slider 50 decreases the energization of the relay coil 33 and increases the energization of the relay coil 34. The switch arm 36 is thereupon moved into engagement with the contact 38 to complete a circuit from the line wire 41 through wire 98, switch arm 36, contact 38, wire 102, limit switch 27, wire 103, field winding 25, and wire 101 back to the other line wire 42. Completion of this circuit energizes the field winding 25 to move the valve 16 towards a closed position. Operation of the motor 13 to move the valve 16 towards a closed position causes righthand movement of the slider 30 of the balancing potentiometer. This right-hand movement of the slider 30 decreases the energization of the relay coil 34 and increases the energization of the relay coil 33. When the slider 30 has moved sufficiently far to the right to rebalance the energizations of the relay coils 33 and 34, the switch arm 36 is moved out of engagement with the contact 38 to break the circuit through the field winding 25. In this manner, the valve 16 is modulated toward a closed position in direct accordance with the amount of increase in space temperature.

By reason of the above construction, a true follow-up system is provided. It is found that if the control range of the control potentiometer is made sufficiently narrow to give an accurate temperature control action, "hunting" is likely to occur. It is also found that if the control range is made sufficiently wide to prevent "hunting", a "droop" in the temperature maintained by the control system becomes noticeable. That is, the space temperature will be maintained at a lower value when the heating load is relatively great than when the heating load is relatively light. In order to eliminate "hunting" and the "drooping" characteristic of the follow-up control system, the reset mechanism generally designated at 15 is utilized. In explaining the operation of the follow-up control system in combination with the reset mechanism, it is assumed that the parts are in the position shown in Figure 1.

Upon an increase in the heating load, the space temperature decreases and the slider 50 is moved to the right in the direction indicated by the character C and valve 16 is moved toward an open position in direct accordance with the amount of decrease in space temperature in the manner pointed out above. A decrease in space temperature also moves the switch arm 52 into engagement with contact 53 to complete a circuit from the line wire 105 through wire 106, switch arm 52, contact 53, wire 107, limit switch 80, wire 108, field winding 77, and wire 109 back to the other line wire 110. Completion of this circuit energizes the field winding 77 to move the slider 59 towards the right with respect to the compensating potentiometer resistance element 58. This right-hand movement of the slider 59 decreases the energization of the relay coil 34 and increases the energization of the relay coil 33 to move the valve 16 further towards an open position and to move the slider 30 of the balancing potentiometer to the left to rebalance the relay 12. As long as the space temperature is less than the desired normal value, the field winding 77 will be energized and the valve 16 will be continued in its opening movement. The rate of this additional opening movement of the valve 16 is controlled by the rate at which the slider 59 moves to the right. When the space temperature is restored to the desired normal value as a result of this additional opening movement of the valve 16, the switch arm 52 is moved out of engagement with the contact 53 and the field winding 77 is deenergized. As a result, the valve 16 is maintained in its newly adjusted position. In other words, the valve 16 is repositioned or reset with respect to the value of the space temperature to supply additional heat to the space to make up for the increase in heating load.

Upon a decrease in the heating load, the space temperature increases and the slider 50 is moved to the left in the direction indicated by the character H. The valve 16 is modulated toward a closed position in direct accordance with the amount of increase in space temperature in the manner pointed out above. An increase in space temperature also causes movement of the switch arm 52 into engagement with the contact 54 to complete a circuit from the line wire 105 through wire 106, switch arm 52, contact 54, wire 111, wire 106, switch arm 52, contact 54, wire 111, limit switch 79, wire 112, field winding 76, and wire 109 back to the other line wire 110. Completion of this circuit energizes the field winding 76 to move the slider 59 to the left. Movement of the slider 59 to the left decreases the energization of the relay coil 33 and increases the energization of the relay coil 34 to move the valve 16 further towards a closed position. The rate at which the valve 16 is so additionally moved towards a closed position is determined by the rate at which the slider 59 moves to the left with respect to the compensating potentiometer resistance element 58. The field winding 76 will remain energized as long as the space temperature is above the desired value and, therefore, the valve 16 will be continued in its closing movement as long as the space temperature is above the desired value. As a result of this additional decrease in heat supplied to the space, the space temperature returns to the desired normal value and the switch arm 52 is moved out of engagement with the contact 54 to break the circuit through the field winding 76. The valve 16 is, therefore, reset or repositioned toward a closed position with respect to the value of the space temperature in accordance with the amount of decrease in the heating load.

By reason of the above construction, the valve 16 is modulated either toward an open or a closed position in accordance with the amount of decrease or increase in space temperature and is further moved toward an open or closed position in accordance with the amount of increase or decrease in the heating load. The rate at which the valve 16 is additionally positioned toward the open or closed position is determined by the rate at which the slider 59 moves across the compensating potentiometer resistance element 58. By moving the pivot pin 65 upwardly in the slot 64 of the lever 63, the slider 59 of the compensating potentiometer will be moved faster than if the pivot pin 65 were in a lower position with respect to the slot 64. Therefore, by moving the pivot pin 65 upwardly, the rate of reset of the valve 16 is increased and by moving the pin 65 downwardly, the rate of reset of the valve 16 is decreased. By properly adjusting the rate of reset in this manner, the control system may be made to operate to maintain the space temperature at the desired normal value without "hunting" and without the occurrence of a "droop" in the space temperature.

Referring now to Figure 2, a different manner for adjusting the rate of reset is shown. The slot 64 and the pivot pin 65 of Figure 1 are not utilized. In other words, in Figure 2 the rod 61 may be operated directly by the cam 69 as in Figure 3. In other words, in Figure 2 the rate of movement of slider 59 is not adjusted as in Figure 1. However, the compensating potentiometer resistance element 58 is mounted upon a vertical slidable bracket 115. The bracket 115 is provided with slots 116 through which extend screws 117. By loosening the screws 117 and sliding the bracket 115 downwardly, the rate at which the slider 59 slides over the resistance element 58 is decreased and, therefore, the rate of reset is decreased. By moving the bracket 115, and consequently the resistance element 58, upwardly the rate at which the slider 59 wipes across the resistance element 58 is increased and, therefore, the rate of reset is increased. The construction of Figure 2, therefore, gives exactly the same results as that of Figure 1 and a further description thereof is not considered necessary.

Although in the system shown by Figures 1 and 2, the rate of reset may be adjusted, the rate of reset is not varied in accordance with the amount of deviation in the space temperature. Stated in another way, for a given adjustment the rate of reset remains constant regardless of how far the space temperature deviates from the desired normal value. In Figure 3, however, provision is made for varying the rate of reset in accordance with the amount of deviation in space temperature. The greater the deviation in space temperature, the faster is the rate of reset. A different manner for adjusting the rate of reset for any given deviation of space temperature is also disclosed in Figure 3. All of the parts utilized in Figure 1 are utilized in Figure 3 and like parts have been indicated by like reference characters. The motor of the reset mechanism 15 for operating the compensating potentiometer, however, is a little different than that shown in Figure 1. The limit switches 79 and 80 are operated by the shaft 72 instead of being operated by the lever 63 as in Figure 1. The lever 63 and its associated adjusting means are eliminated in Figure 3. The control potentiometer of Figure 3 and the balancing potentiometer are connected to the relay 12 in exactly the same manner as in Figure 1 and, therefore, the valve 16 is modulated in accordance with deviations in space temperature in exactly the same manner as in Figure 1.

In Figure 3, however, the bell crank lever 46 operated by the thermostatic device 45 carries an arm 120 which is connected by a link 121 to a slidable carriage 122. The carriage 122 is provided with elongated slots 123 through which extend pins 124. The carriage 122 is guided for reciprocation by the pins 124. The carriage 122 carries a slider 125 which is adapted to slide across a center tap resistance element 126. The carriage 122 also carries cam surfaces 127 and 128 which are engaged by bell crank levers 129 and 130, respectively. The bell crank levers 129 and 130 carry sliders 131 and 132 which are adapted to slide across resistance elements 133 and 134. When the space temperature is at the desired normal value, the carriage 122 is in a midposition and the bell crank levers 129 and 130 engage the highest portion of the cams 127 and 128. Sliders 131 and 132 are, therefore, in an outward position as shown in Figure 3. When the space temperature decreases, the carriage 122 is moved to the left and the sliders 131 and 132 move inwardly with respect to their resistance elements 133 and 134. In a like manner, when the space temperature increases, the carriage 122 moves to the right and the sliders 131 and 132 move inwardly. In other words, whenever the space temperature deviates from the desired normal value, the sliders 131 and 132 move inwardly with respect to their resistance elements 133 and 134 and the amount of this inward movement is dependent upon the amount of deviation of the space temperature from the desired normal value.

The inner ends of the resistance elements 133 and 134 are connected by wires 135 and 137 to variable resistances 136 and 138. The variable resistance 136 is connected to the junction of wires 85 and 86 and the variable resistance 138 is connected to the junction of wires 89 and 90. The sliders 131 and 132 are connected by wires 139 and 140, respectively, to the left and right ends of the compensating potentiometer resistance element 58. The center tap of the resistance element 126 is connected by a wire 141 to a variable resistance 142 which, in turn, is connected by a wire 143 to the slider 59 of the compensating potentiometer. By reason of these wiring connections, it is seen that the compensating potentiometer is connected in parallel with the control potentiometer and with the series connected relay coils 33 and 34 in exactly the same manner as in Figure 1. However, these connections include resistances not shown in Figure 1. The resistances 133 and 136 are in series with the left end of the compensating potentiometer and the resistances 134 and 138 are in series with the right end of the compensating potentiometer resistance element 58. In other words, the resistance elements 133, 136 and 134, 138 may be considered part of the compensating potentiometer resistance element which are not wiped by the slider 59 of the compensating potentiometer.

By moving the contacts of the variable resistances 136 and 138 downwardly to increase the resistance in these variable resistances, the effective length of the compensating potentiometer is increased and, therefore, the compensating effect of the compensating potentiometer is decreased. In other words, the rate at which the valve 16 is reset by a given speed of motion of the slider 59 is decreased. Therefore, by increasing the resistance of the variable resistances 136 and 138, the rate of reset of the valve 16 is decreased. Conversely, by sliding the contacts of the variable resistances 136 and 138 upwardly to decrease the resistance in series with the compensating potentiometer resistance element 58, the controlling effect of the compensating potentiometer is increased and the valve 16 will be reset more rapidly for a given rate of movement of the slider 59. It follows then that by decreasing the resistance of the variable resistances 136 and 138, the rate of reset of the valve 16 is increased. The variable resistance 142 in series with the slider 59 of the compensating potentiometer is utilized for maintaining the current flow through the compensating potentiometer constant so that linear results will be obtained. Whenever the resistance values of the variable resistances 136 and 138 are decreased, the resistance value of the variable resistance 142 must be increased in order to get the desired results. By using the three variable resistances 136, 138 and 142, exactly the same results as are obtained in Figures 1 and 2 are obtained in Figure 3.

In order to vary the rate of reset in accordance with the amount of deviation in space temperature, the variable resistances 133 and 134 are utilized. As the space temperature deviates from the desired normal value, the resistance values of the resistance elements 133 and 134 are decreased and, therefore, the resistance in series with the compensating potentiometer resistance element 58 is decreased. In other words, as the space temperature deviates from the desired normal value, the effective length of the compensating potentiometer is decreased in accordance with the amount of deviation of the space temperature from the desired normal value. Therefore, the rate of reset of the valve 16 increases as the space temperature deviates from the desired normal value. The resistance 126 and the slider 125 carried by the carriage 122 is utilized for maintaining the current flow through the compensating potentiometer constant as the resistances 133 and 134 are varied.

By reason of the construction in Figure 3, it is seen that provision is not only made for adjusting the rate of reset of the valve 16 for any given deviation of space temperature but that provision is also made for adjusting the rate of reset in accordance with the amount of deviation in space temperature. More specifically, the farther the space temperature deviates from the desired normal value, the more rapid will be the rate of reset.

Although for purposes of illustration, I have shown several forms of my invention, other forms thereof may become apparent to those skilled in the art upon reference to this specification and, therefore, this invention is to be limited only by the scope of the appended claims and prior art.

I claim as my invention:

1. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, and means for varying the portion of the total effective resistance of the compensating potentiometer that is traversed by the slider thereof upon a predetermined movement of the reversible power means to adjust the rate of additional positioning of the device.

2. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, and adjusting means included in the connection between the reversible power means and the slider of the compensating potentiometer for adjusting the rate of movement of the slider by the reversible power means to adjust the rate of additional positioning of the device.

3. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, compensating means comprising a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, and means for varying the effective length of the resistance element of the compensating potentiometer without altering the total resistance of the compensating means to adjust the rate of effective adjustment of the compensating potentiometer by the reversible power means whereby the rate of additional positioning of the device is adjusted.

4. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer including a relatively stationary resistance element and a movable pivoted slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, and means for relatively adjusting the resistance element of the compensating potentiometer with respect to the pivot of the slider to adjust the effective length of the resistance element and hence the rate of effective adjustment of the compensating potentiometer whereby the rate of additional positioning of the device is adjusted.

5. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, compensating means comprising a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, and adjustable resistance means in the connections of the compensating potentiometer for varying the effective length of the resistance element of the compensating potentiometer without altering the total resistance of the compensating means to adjust the rate of effective adjustment of the compensating potentiometer whereby the rate of additional positioning of the device is adjusted.

6. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer, a reversible motor for adjusting the compensating potentiometer, control means for operating the reversible motor when the condition to be controlled deviates from the desired normal value and in a direction corresponding to the direction of deviation of the condition, means for connecting the compensating potentiometer in parallel with the control potentiometer additionally to position the device with respect to the adjustment of the control potentiometer for returning the value of the condition toward normal, means for adjusting the rate of adjustment of the compensating potentiometer by the reversible motor to adjust the rate of additional positioning of the device, and means for controlling said last mentioned means in accordance with the amount of deviation of the condition from the desired normal value to adjust the rate of additional positioning of the device in accordance with the amount of deviation of the condition from the desired normal value.

7. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, means independent of the speed of the reversible power means for adjusting the rate of adjustment of the compensating potentiometer by the reversible power means to adjust the rate of additional positioning of the device, and means for controlling said last mentioned means in accordance with the amount of deviation of the condition from the desired normal value to adjust the rate of additional positioning of the device in accordance with the amount of deviation of the condition from the desired normal value.

8. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, means for varying the effective length of the resistance element of the compensating potentiometer to adjust the rate of effective adjustment of the compensating potentiometer by the reversible power means whereby the rate of additional positioning of the device is adjusted, and means for controlling said last mentioned means in accordance with the amount of deviation of the condition from the desired normal value to adjust the rate of additional positioning of the device in accordance with the amount of deviation of the condition from the desired normal value.

9. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control poteniometer for returning the value of the condition toward normal, adjustable resistance means in the connections of the compensating potentiometer for varying the effective length of the resistance element of the compensating potentiometer to adjust the rate of effective adjustment of the compensating potentiometer whereby the rate of additional positioning of the device is adjusted, and means for controlling the adjustment of the adjustable resistance means in accordance with the amount of deviation of the condition from the desired normal value to adjust the rate of additional positioning of the device in accordance with the amount of deviation of the condition from the desired normal value.

10. In combination, a device to be positioned in a plurality of positions for controlling the value of a condition, a control potentiometer adjusted in accordance with changes in the value of the condition to be controlled and having a desired adjustment corresponding to a desired value of the condition, means, including follow-up means operated by the device, controlled by the control potentiometer for positioning the device in accordance with the adjustment of the control potentiometer to maintain the condition to be controlled within certain limits, a compensating potentiometer including a relatively stationary resistance element and a movable slider cooperating therewith, means including reversible power means operated upon deviation of the value of the condition from the desired normal value and in a direction corresponding to the direction of deviation, a connection between the reversible power means and the slider of the compensating potentiometer, means for connecting the compensating potentiometer in parallel with the control potentiometer additionally to position the device with respect to the adjustment of the control potentiometer for returning the value of the condition toward normal, resistance means connected in series with the ends of the resistance element of the compensating potentiometer for varying the effective length thereof to adjust the rate of effective adjustment of the compensating potentiometer whereby the rate of additional positioning of the device is adjusted, and resistance means connected in series with the slider of the compensating potentiometer for maintaining the total resistance of the compensating potentiometer substantially constant.

CHARLES B. SPANGENBERG.